United States Patent
Beauvais

(10) Patent No.: US 10,174,791 B2
(45) Date of Patent: Jan. 8, 2019

(54) BALL BEARING ASSEMBLY WITH INNER RING AND LUBRICATION THEREFOR

(71) Applicant: PRATT & WHITNEY CANADA CORP., Longueuil (CA)

(72) Inventor: Gilles Beauvais, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 15/191,069

(22) Filed: Jun. 23, 2016

(65) Prior Publication Data

US 2017/0370414 A1 Dec. 28, 2017

(51) Int. Cl.
*F16C 33/66* (2006.01)
*F16C 19/16* (2006.01)

(52) U.S. Cl.
CPC .......... *F16C 33/6677* (2013.01); *F16C 19/16* (2013.01); *F16C 2360/23* (2013.01)

(58) Field of Classification Search
CPC .... F16C 33/586; F16C 33/60; F16C 33/6674; F16C 33/6677; F16C 33/6681; F16C 2360/23
See application file for complete search history.

(56) References Cited

U.S. PATENT DOCUMENTS

| | | | |
|---|---|---|---|
| 3,915,521 A | 10/1975 | Young | |
| 4,334,720 A | 6/1982 | Signer | |
| 4,428,628 A * | 1/1984 | Brown | F16C 19/28 384/467 |
| 4,463,994 A | 8/1984 | Eliason et al. | |
| 5,106,209 A | 4/1992 | Atkinson et al. | |
| 7,931,407 B2 | 4/2011 | Begin et al. | |
| 8,517,612 B2 * | 8/2013 | Metzger | F16C 33/58 384/475 |
| 8,616,777 B1 * | 12/2013 | Smith | F16C 33/6677 384/475 |
| 2006/0062504 A1 * | 3/2006 | Wilton | F16C 19/26 384/475 |

* cited by examiner

*Primary Examiner* — James Pilkington
(74) *Attorney, Agent, or Firm* — Norton Rose Fulbright Canada LLP

(57) ABSTRACT

A bearing assembly comprises ring assemblies cooperating to form a roller volume. A single circumferential slot is in an inner circumferential surface of the inner ring assembly and in fluid communication with the roller volume through central passages in the inner ring assembly. The proximal inner ring includes proximal axial slots extending axially along a proximal portion of the inner circumferential surface, a first plurality of the proximal axial slots being in fluid communication with the roller volume, a second plurality of the proximal axial slots not in fluid communication with the roller volume. The distal inner ring includes distal axial slots extending axially along a distal portion of the inner circumferential surface from the circumferential slot to respective distal passages in fluid communication with the roller volume, wherein a circumferential spacing between adjacent proximal axial slots is equivalent to a circumferential spacing between adjacent distal axial slots.

32 Claims, 8 Drawing Sheets

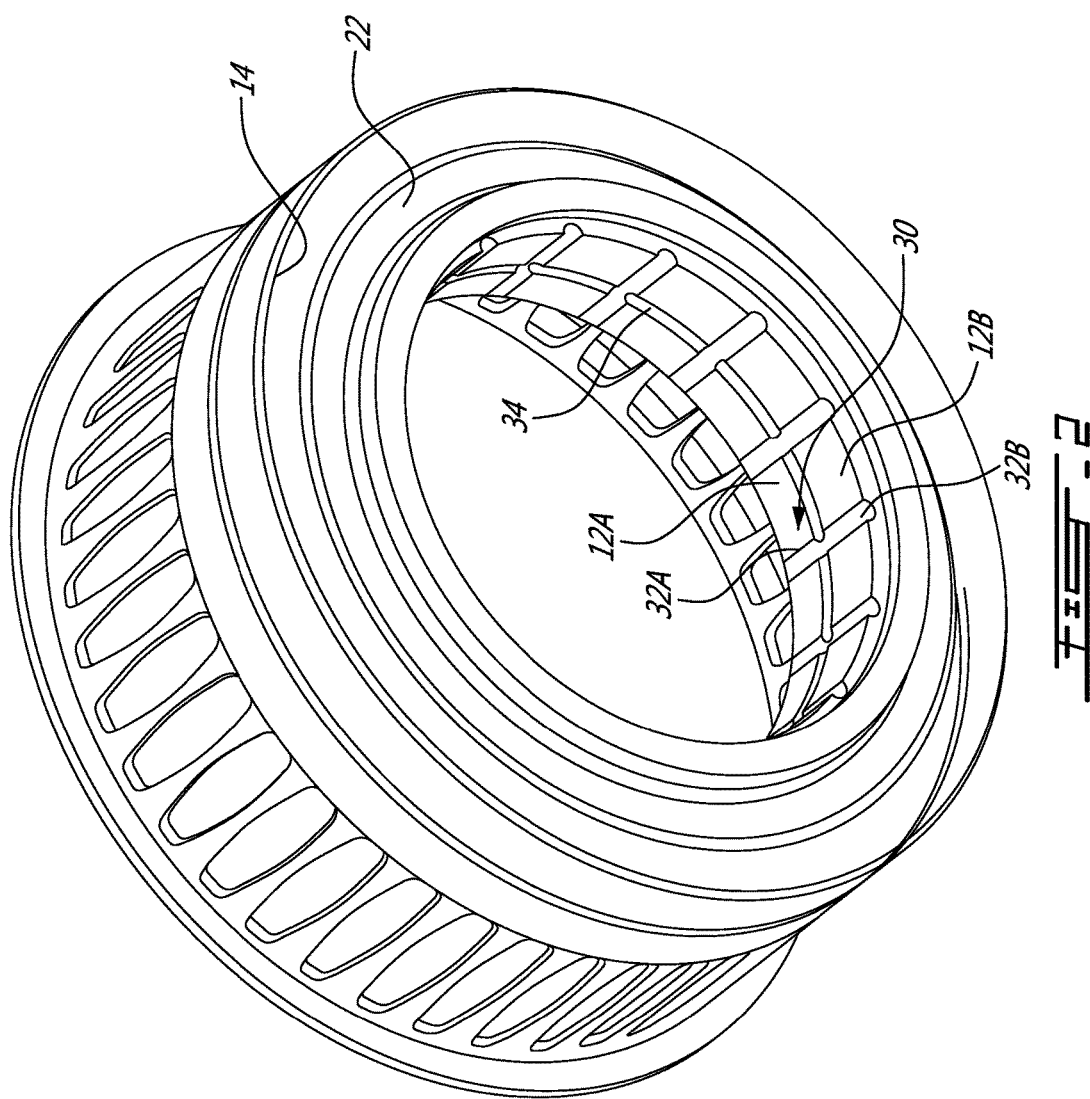

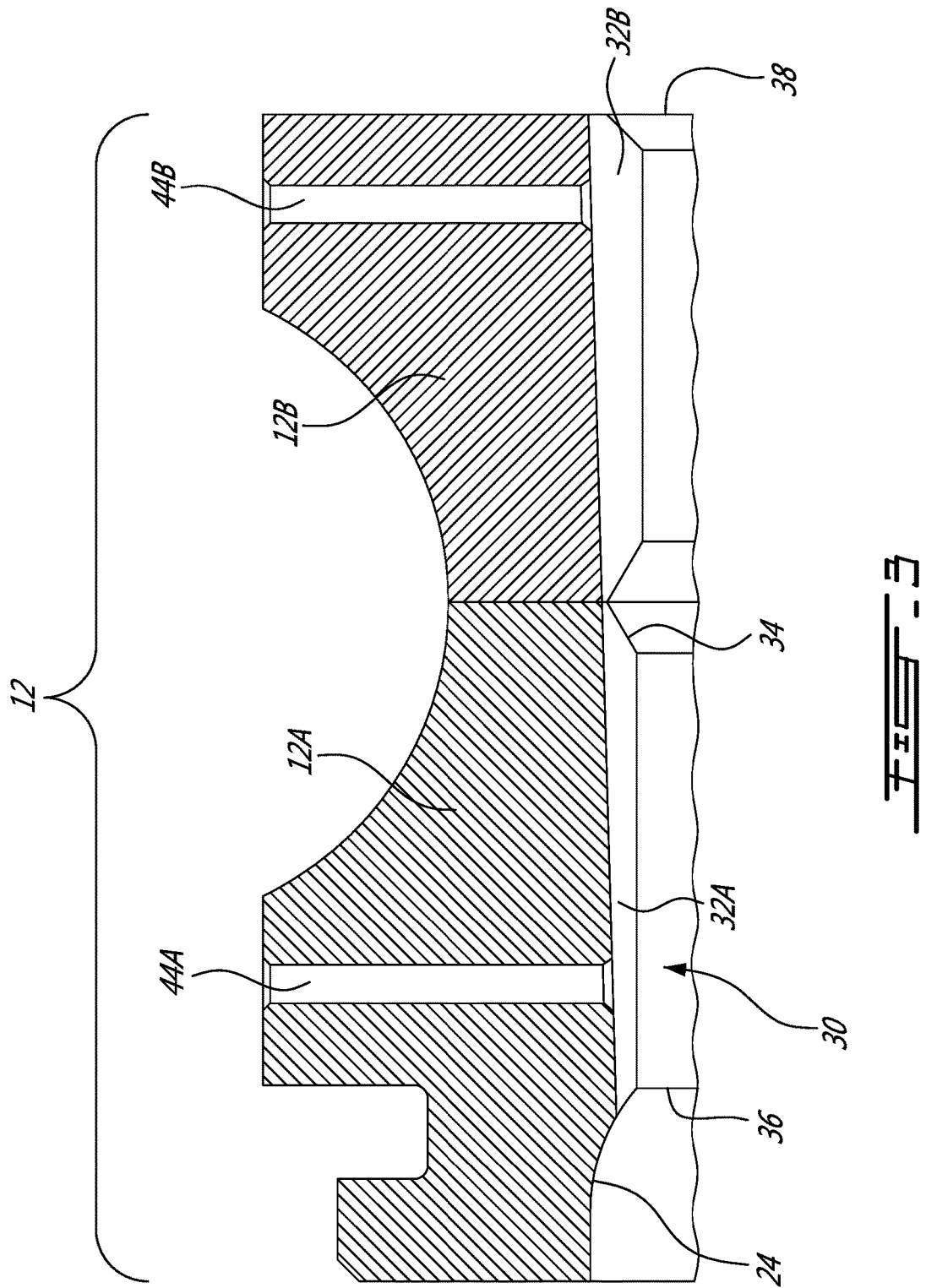

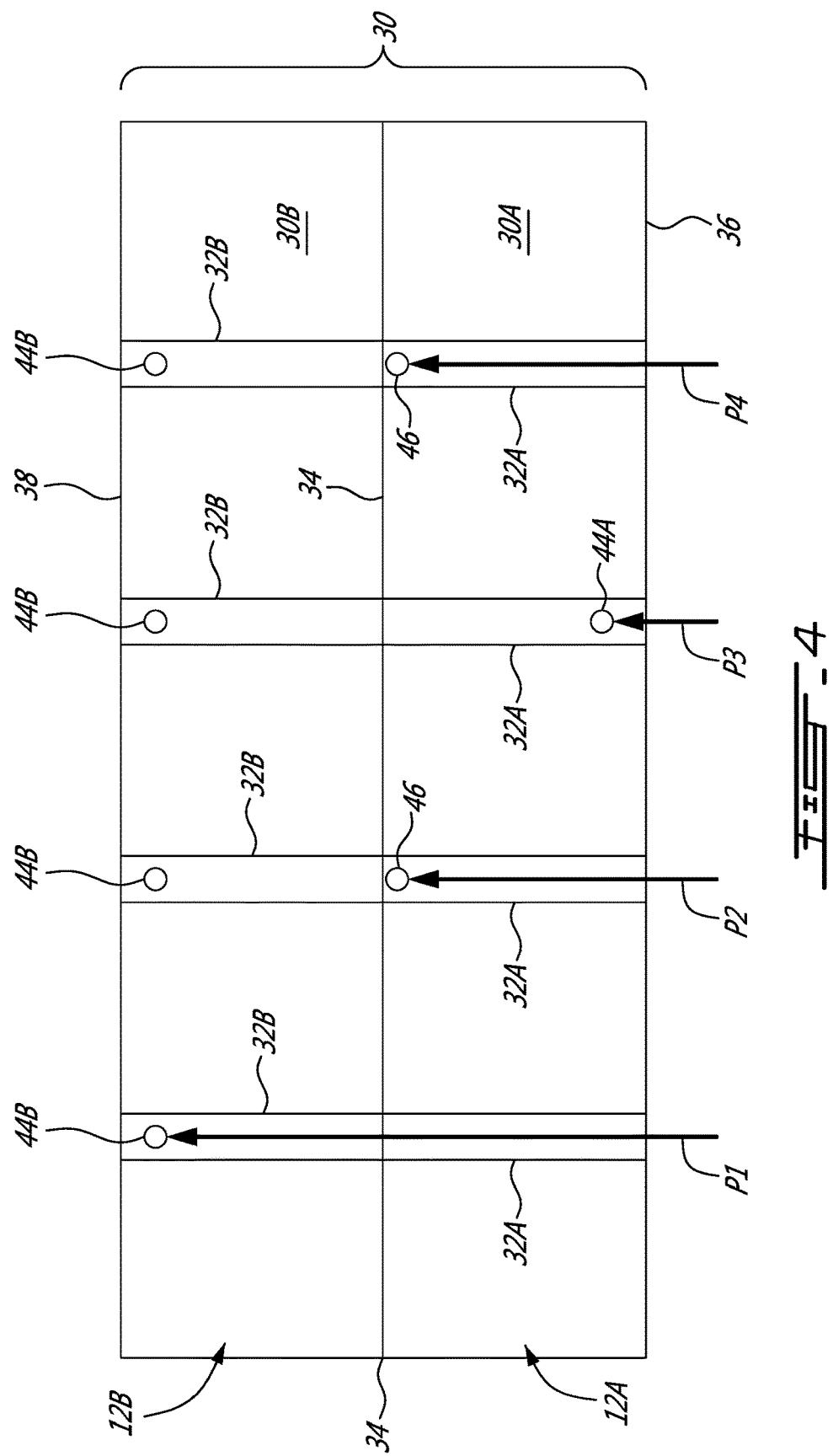

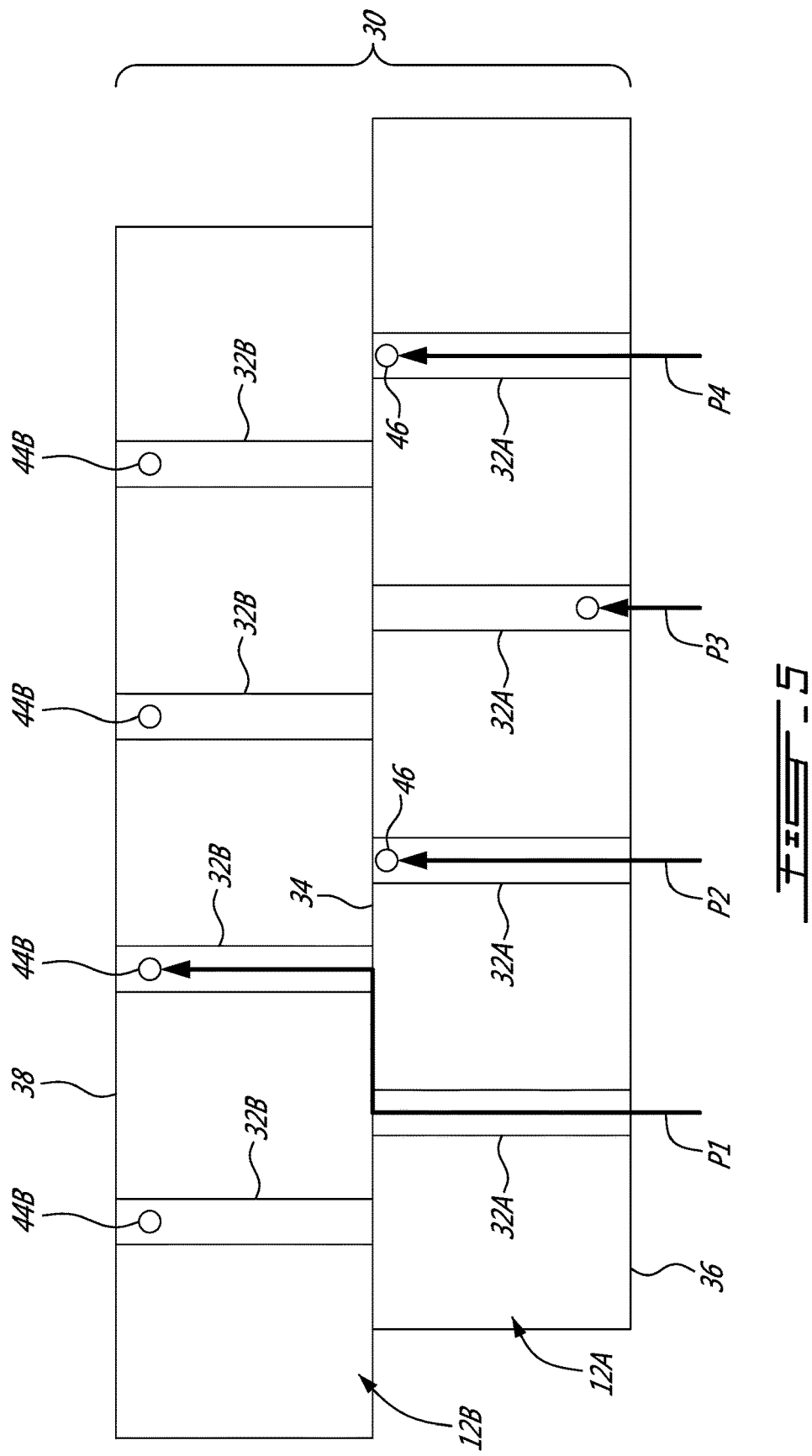

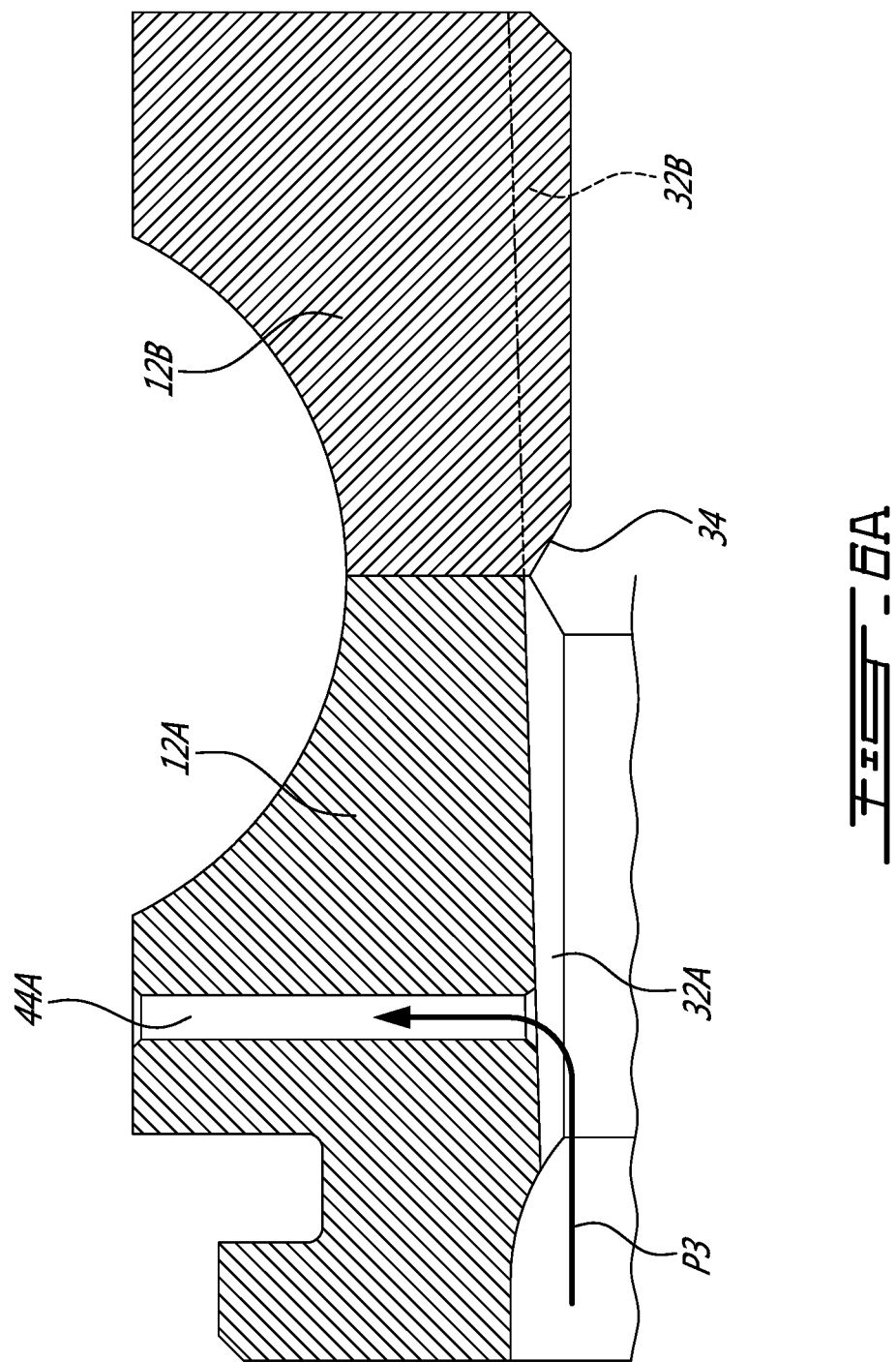

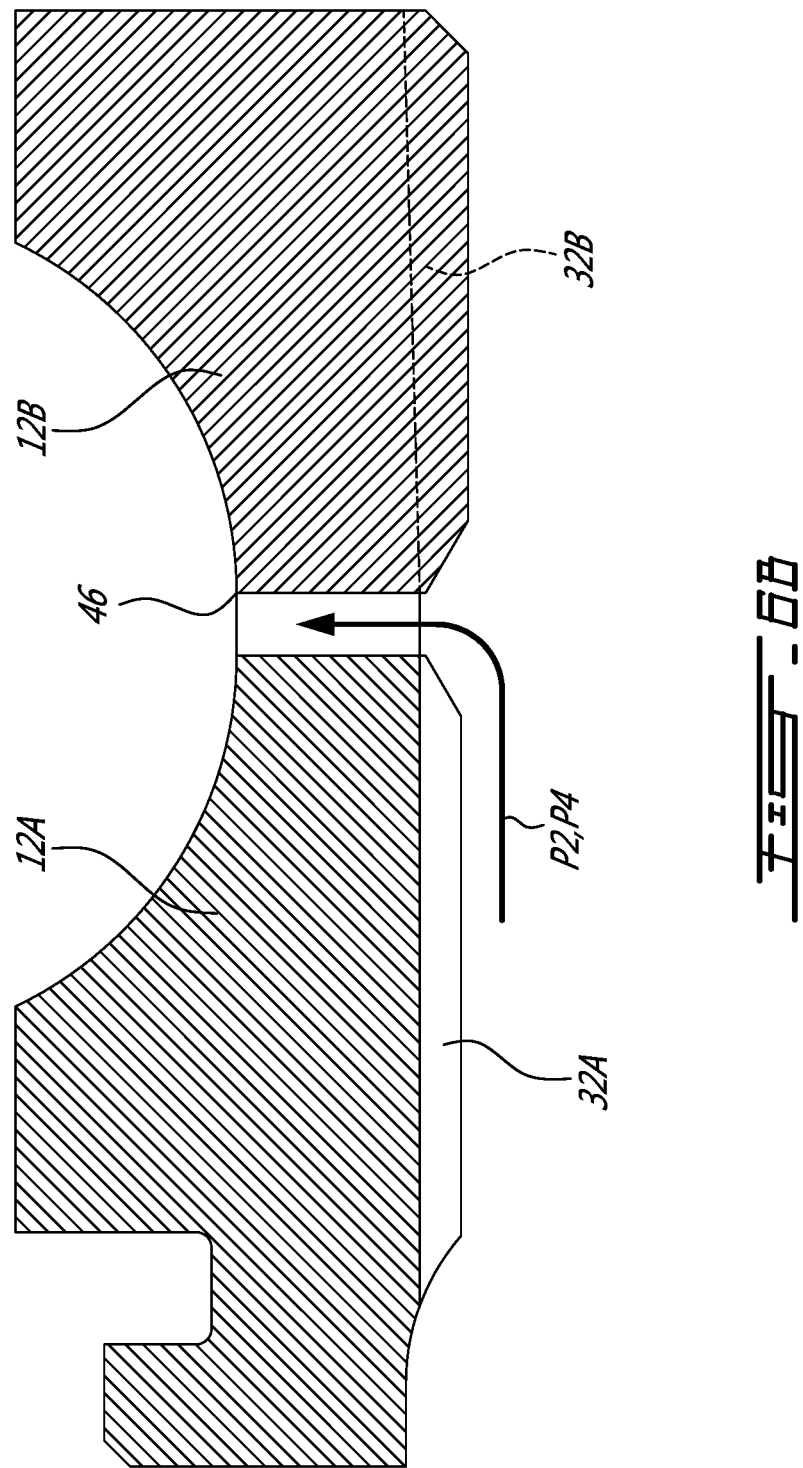

BALL BEARING ASSEMBLY WITH INNER RING AND LUBRICATION THEREFOR

TECHNICAL FIELD

The application relates generally to ball bearing assemblies and, more particularly, to an inner ring for such an assembly.

BACKGROUND OF THE ART

To reduce wear on bearing assemblies such as those used in gas turbine engines, lubricating fluid such as oil is typically used to keep them cool and lubricate them. In particular, some of these bearing may be high-speed bearings, whereby adequate lubricating may increase their durability. Lubricating fluid (i.e., lubricant such as may be delivered by being channeled under the bearing, for example through axial slots formed on an inside surface of an inner ring of the bearing assembly, with radial holes extending through the inner ring to intersect the axial slots. In ball bearings, the inner ring is constituted of two inner rings, each with its own set of axial slots. If the axial slots of the two inner rings are not aligned, there may result an insufficient lubrication of the distal inner rings. Indeed, the inner ring distal from the oil feed may receive a limited amount of oil due to misalignment between inner rings, and this may cause a temperature increase, further resulting in a loss of bearing material properties and a reduction of the bearing life.

SUMMARY

In one aspect, there is provided a bearing assembly comprising: an outer ring defining a central axis of rotation for the bearing assembly; an inner ring assembly disposed radially inwardly of the outer ring and cooperating therewith to form a roller volume, the inner ring assembly having a proximal inner ring, a distal inner ring, and a single circumferential slot in an inner circumferential surface of the inner ring assembly, the circumferential slot being in fluid communication with the roller volume through central passages in the inner ring assembly, the proximal inner ring including proximal axial slots formed in, extending axially along and circumferentially spaced around a proximal portion of the inner circumferential surface, each said proximal axial slots extending axially from openings in an axial face of the proximal inner ring to the circumferential slot defined in the inner circumferential surface, a first plurality of the proximal axial slots being in fluid communication with the roller volume through respective proximal passages in the proximal inner ring, a second plurality of the proximal axial slots being without proximal passages in the proximal inner ring so as not to be in fluid communication with the roller volume, and the distal inner ring including distal axial slots formed in, extending axially along and circumferentially spaced around a distal portion of the inner circumferential surface, each said axial slots extending axially from the circumferential slot at least to respective distal passages in fluid communication with the roller volume, wherein a circumferential spacing between adjacent proximal axial slots is equivalent to a circumferential spacing between adjacent distal axial slots; and ball bearing elements in the roller volume rollingly disposed against an inner circumferential surface of the outer ring and an outer circumferential surface of the inner ring, the bearing elements allowing relative rotational motion between the outer ring and the inner ring.

In another aspect, there is provided a bearing assembly comprising: an outer ring defining a central axis of rotation for the bearing assembly; an inner ring assembly disposed radially inwardly of the outer ring and cooperating therewith to form a roller volume, the inner ring assembly having a proximal inner ring, a distal inner ring, and a single circumferential slot in an inner circumferential surface of the inner ring assembly, the circumferential slot being in fluid communication with the roller volume through central passages in the inner ring assembly, the proximal inner ring including proximal axial slots formed in, extending axially along and circumferentially spaced around a proximal portion of the inner circumferential surface, each said proximal axial slots extending axially from openings in an axial face of the proximal inner ring to the circumferential slot defined in the inner circumferential surface, a first plurality of the proximal axial slots being in fluid communication with the roller volume through respective proximal passages in the proximal inner ring, a second plurality of the proximal axial slots being without proximal passages in the proximal inner ring so as not to be in fluid communication with the roller volume, and the distal inner ring including distal axial slots formed in, extending axially along and circumferentially spaced around a distal portion of the inner circumferential surface, each said axial slots extending axially from the circumferential slot at least to respective distal passages in fluid communication with the roller volume, wherein a same number of the proximal axial slots and the distal axial slots are provided; and ball bearing elements in the roller volume rollingly disposed against an inner circumferential surface of the outer ring and an outer circumferential surface of the inner ring, the bearing elements allowing relative rotational motion between the outer ring and the inner ring.

In yet another aspect, there is provided a method of lubricating a bearing assembly comprising: feeding a lubricating fluid to proximal axial slots of a proximal inner ring; diverting a first part of the lubricating fluid into proximal passages defined into the proximal inner ring in a first plurality of the proximal axial slots; directing a second part of the lubricating fluid from a second plurality of the proximal axial slots to a circumferential slot defined at junction between the proximal inner ring and a distal inner ring; diverting a portion of the second part of the lubricating fluid into central passages in fluid communication with a roller volume; directing another portion of the second part of the lubricating fluid from the circumferential slot to a fraction of a plurality of distal axial slots of a distal inner ring and into distal passages defined into the distal inner ring

DESCRIPTION OF THE DRAWINGS

Reference is now made to the accompanying figures in which:

FIG. 2 is a perspective view of the bearing assembly of FIG. 1;

FIG. 3 is a schematic cross-section of part of an inner ring assembly of the bearing assembly of FIG. 1;

FIG. 4 is a schematic plan view of lubrication paths when axial slots are aligned in the inner ring assembly;

FIG. 5 is a schematic plan view of lubrication paths when axial slots are not aligned in the inner ring assembly FIGS. 6A, 6B and 6C are schematic illustrations of fluid paths P1, P2, P3 and P4.

DETAILED DESCRIPTION

Figure 1:
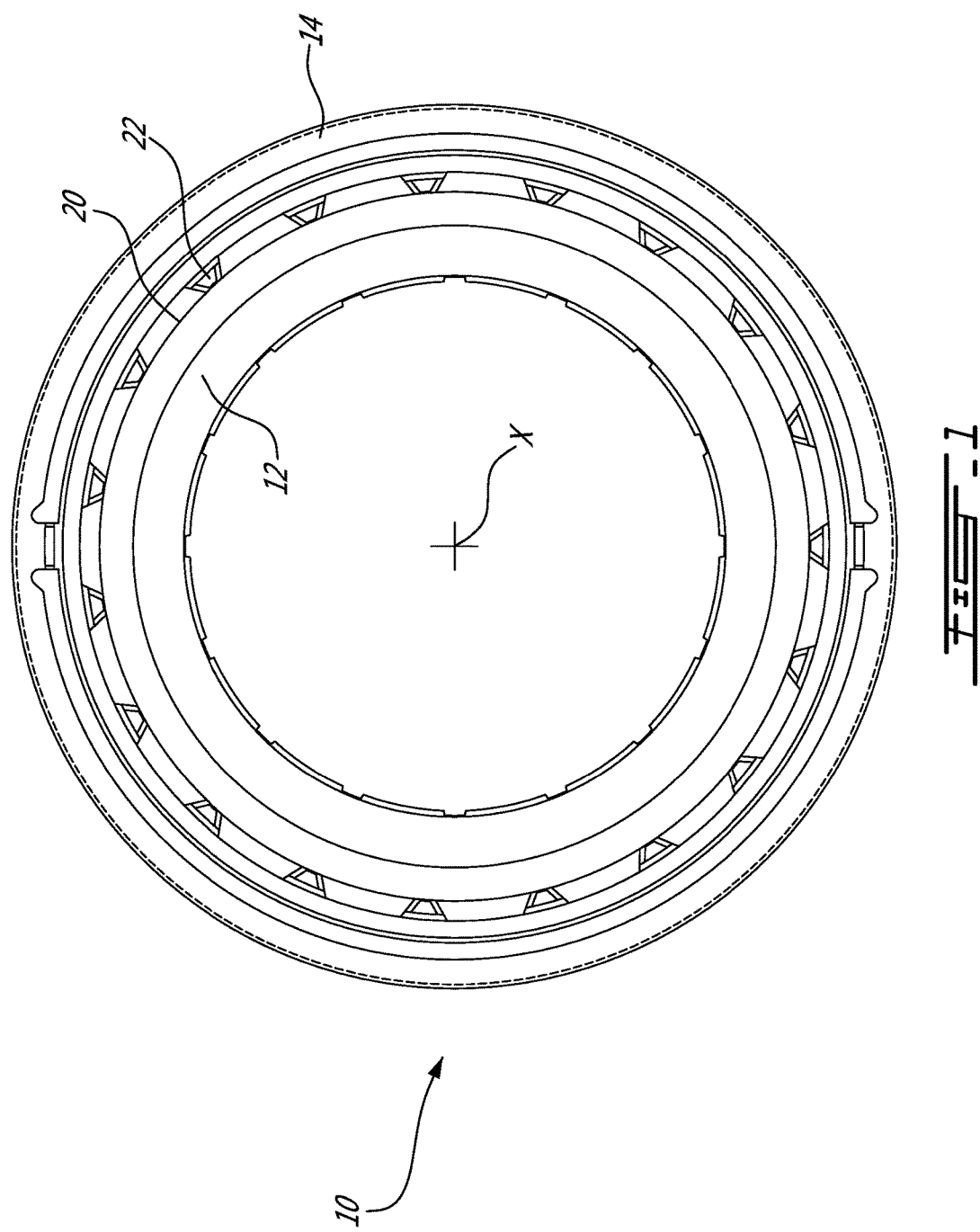
FIG. 1 is a schematic front view of a bearing assembly in accordance with a particular embodiment.

Referring to FIGS. 1-2, a bearing assembly 10 in accordance with a particular embodiment is shown. According to an embodiment, the bearing assembly 10 is a high speed ball bearing, in that it may rotate in excess of 2.0 MDN (bearing bore diameter in millimeters times speed in rpm divided by one million), although it may be used in bearing assemblies operating at lesser speeds. The bearing assembly 10 generally includes concentric inner ring assembly 12, consisting of a proximal inner ring 12A and a distal inner ring 12B, and outer ring 14 respectively defining concurrently a roller volume including inner and outer races in which a plurality of bearing elements 20 retained by a cage member 22 are received to allow relative rotation between the inner ring assembly 12 and outer ring 14. In the embodiments shown, the bearing elements 20 are balls bearings, but it is understood that other types of bearing elements can alternately be used, such as for example roller bearings and tapered bearings. The cage member 22 is received between the inner and outer rings 12, 14 and equally spaces the bearing elements 20 apart such that each bearing element 20 rotates around the inner and outer races without contacting the other bearing elements 20.

Referring more particularly to FIGS. 1 and 2, the outer ring 14 has a ring body that is centered on a central axis X of the bearing assembly 10, with the outer race being defined on an inner surface thereof around its circumference. Although not shown in FIG. 2, the inner surface may be at the same diameter as the outer race. The inner ring assembly 12 may also be centered on the central axis X of the bearing assembly 10, with the inner race being defined on an outer surface thereof around its circumference. An oil gallery 24 may be defined at an exterior of the proximal inner ring 12A.

Referring to FIGS. 3-5, the inner circumferential surface 30 of the inner ring assembly 12 includes a plurality of axial slots 32 and a circumferential slot 34 defined therein. In the figures, the axial slots 32 may be shown as 32A and 32B (concurrently referred to as 32), the "A" indicating that the axial slots 32A are proximal axial slots as they are defined in the proximal inner ring 12A, the "B" indicating that the axial slots 32B are distal axial slots as they are defined in the distal inner ring 12B. The slot 34 may extend about the full circumference of the inner circumferential surface 30 (i.e., 360 degrees). The slot 34 may be less than 360 degrees as well. However, as a single unit, the slot 34 is in fluid communication with each of the axial slots 32. The slot 34 may be located at a junction or meeting plane between the proximal inner ring 12A and the distal inner ring 12B, and may consist of a circumferential slot portion 34A in the proximal inner ring 12A and a circumferential slot portion 34B in the distal inner ring 12B. The slot 34 may alternatively be entirely located in either one of the inner rings 12A or 12B.

The axial slots 32A extend along the axial direction of the bearing assembly 10, and are circumferentially spaced apart in the proximal portion of the inner circumferential surface 30 (e.g., the part 30A of the surface in the proximal inner ring 12A). In the embodiment shown in FIG. 2, the axial slots 32A may be equidistantly spaced apart around the circumference of the proximal inner ring 12A, although a non-equidistant spacing pattern may also be used. Each axial slot 32A extends straight across the inner surface 30 from a first axial face 36 of the inner ring assembly 12 to the circumferential slot 34. As observed in FIG. 3, a depth $D_A$ of the axial slots 32A may increase (e.g., linearly) from the proximal axial face 36 to the circumferential slot 34, to assist in moving lubricant axially along the slots 32A.

The axial slots 32B extend as well along the axial direction of the bearing assembly 10, and are circumferentially spaced apart in the distal portion of the inner circumferential surface 30 (e.g., the part of the surface 30 in the distal inner ring 12B). In the embodiment shown in FIG. 2, the axial slots 32B may be equidistantly spaced apart around the circumference of the proximal inner ring 12B, although a non-equidistant spacing pattern may also be used. Each axial slot 32B extends straight across the inner surface 30 from the circumferential slot 34 to a second axial face 38 of the inner ring assembly 12, although the axial slots 32B could also extend only to radial holes in the inner ring 12B as described hereinafter. Again, a depth $D_B$ of the axial slots 32A may increase from the circumferential slot 34 toward the distal axial face 38, to assist in moving lubricant axially along the slots 32B. The depth of the axial slots 32B at the junction with the circumferential slot 34 is greater than the depth of the circumferential slot 34, as observed in FIG. 3, or may be equal but with the depth of the slots 32B increasing axially as described above, to create a cascade effect.

According to an embodiment, the inner ring assembly 12 may have an equal number of proximal axial slots 32A and of distal slots 32B. According to an embodiment, the circumferential spacing or circumferential spacing pattern between the proximal axial slots 32A is equal to that between the distal axial slots 32B. According to another embodiment, the inner ring assembly 12 has an equal number of proximal axial slots 32A and of distal slots 32B and the circumferential spacing or circumferential spacing pattern as well.

Referring to FIGS. 3-5, the inner ring 12 also includes a plurality of radial passages 44, 46 defined therethrough (a.k.a, channels, throughbores, holes, etc). The radial passages concurrently referred to as 44 are shown as 44A and 44B in the Figs., the "A" indicating that the passages 44A are proximal passages as they are defined in the proximal inner ring 12A, the "B" indicating that the passages 44B are distal passages as they are defined in the distal inner ring 12B. The radial passages 46 are central passages as they extend into the inner ring assembly 12 from the circumferential slot 34.

The proximal/distal passages 44 are defined as shoulder radial passages, whereas the central passages 46 are race radial passages (a.k.a., middle groove). For example, the shoulder radial passages 44 feed the lubricating fluid to the cage piloting surface at shoulders of the inner ring assembly 12 in the roller volume, whereas the race radial passages 46 extend through the inner ring assembly 12 to the inner race. The race radial passages 46 provide lubricating fluid directly to the bearing element 20 and the inner race contact interface. In an embodiment, the central passages 46 are defined in the inner ring 12A and are located at ends of the axial slots 32A, although they may not be axially aligned with the axial slots 32A. Likewise, the central passages 46 may be defined in the inner ring 12B, provided that the central passages 46 are in fluid communication with the circumferential slot 34.

According to an embodiment, there is a greater amount of the distal passages 44B than of the proximal passages 44A or of the central passages 46. According to an embodiment, there is a greater amount of the central passages 46 than of the proximal passages 44A. For example, as shown in FIGS. 4 and 5, for each set of four axial slots 32, all four distal axial slots 32B have a respective distal passage 44B, the corresponding section of the circumferential slot 34 has two central passages 46, and a single one of the proximal axial slots 32A has a proximal passage 44A (i.e., a 4:2:1 ratio). Other arrangements are possible, such as 4:1:1 ratio, a 3:2:1 ratio, a 3:1:1 ratio, among possibilities.

Referring to FIGS. 4 and 5, the axial slots 32, circumferential slot 34, and radial passages 44, 46 function together as a series of fluid passages to deliver lubricating fluid to the bearing assembly 10, such that the bearing assembly 10 is lubricated proximally, centrally and distally. FIGS. 4 and 5, although shown as being plan views, are circumferential views of the inner circumferential surface 30 as laid flat on the sheet of paper.

Figure 6C:
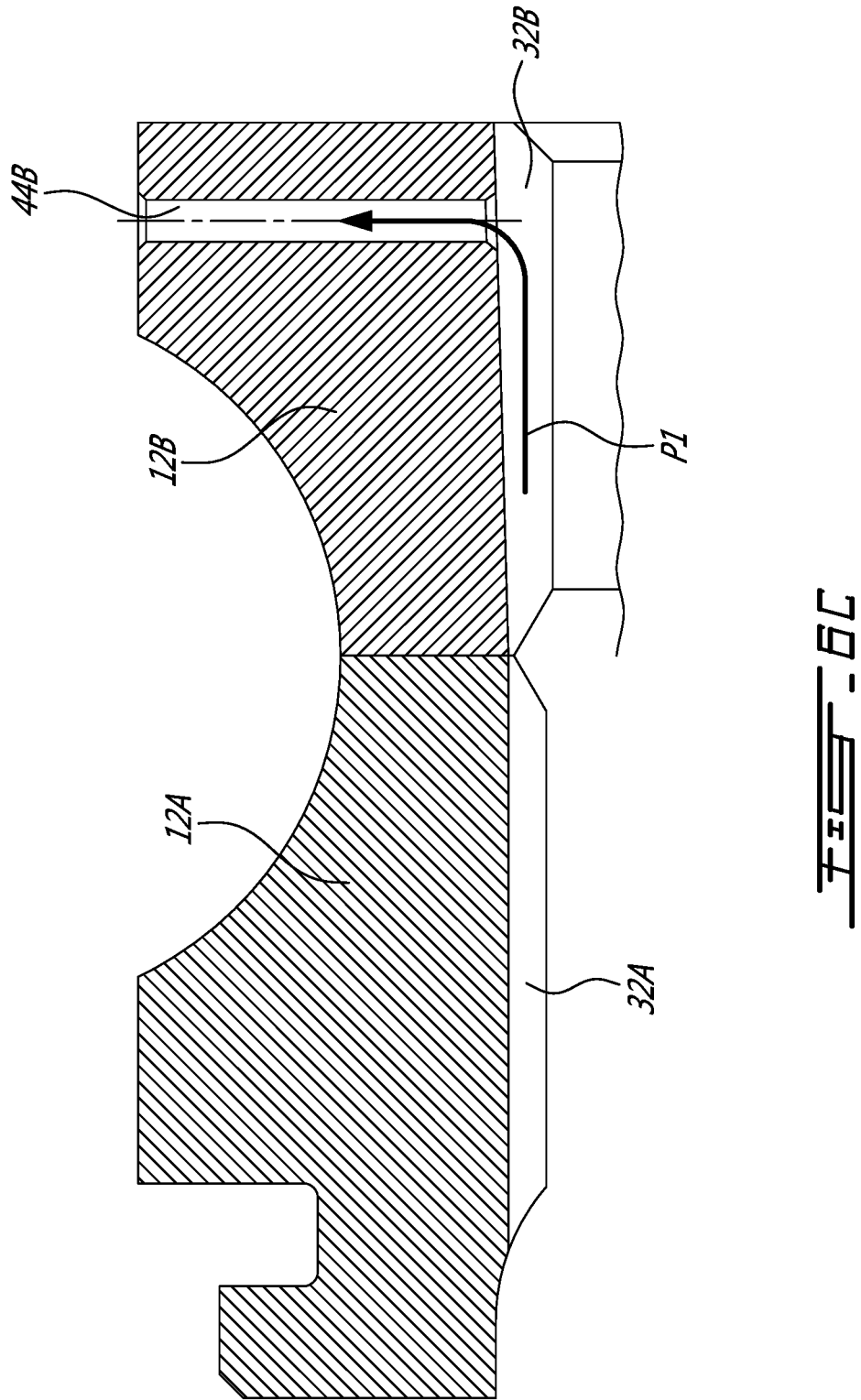

Once the inner ring 12 has been mounted to a shaft, lubricating fluid is circulated to the inner ring 12, for example from a radial scoop or an axial scoop depending on the space available for the bearing assembly 10, via the gallery 24. Therefore, the lubricant fluid is fed at the proximal axial face 36 of the inner ring assembly 12. The lubricating fluid is first circulated axially along the inner surface 30 of the inner ring 12 following a plurality of distinct paths initially defined by the axial slots 32A, and shown as P1, P2, P3, and P4. In the examples of FIGS. 4 and 5, as only one of the four axial slots 32A has a proximal passage 44A, only P3 lubricant will flow into the inner ring 12A, while lubricant in paths P1, P2 and P4 reach the circumferential slot 34. P2 and P4 feed the central passages 46 with lubricant. The paths P1, P2, P3 and P4 are illustrated in FIGS. 6A to 6C.

In FIG. 4, the axial slots 32A and 32B are axially aligned, such that lubricant in P1 flows to the axial slot 32B and into the distal passage 44B. In FIG. 5, the axial slots 32A and 32B are not aligned. Accordingly, the lubricant in path P1 will flow from the proximal axial slot 32A, through a section of the circumferential slot 34, and to the first available distal axial slot 32B (for example due to the greater or increasing depth of the slot 32B). As all distal axial slots 32B have one of the distal passages 44B, the lubricant in path P1 will necessarily feed one of the distal passages 44B, even if the axial slots 32A and 32B are misaligned. Therefore, there are redundant axial slots 32B and distal passages 44B, to ensure that at least some of the distal passages 44B will be fed with lubricant even if the axial slots 32A and 32B are misaligned. By the arrangement of redundant axial slots 32B, and the absence of proximal passages 44A in a plurality of the axial slots 32A, the improper alignment of the slots 32A and 32B between the inner rings 12A and 12B will not compromise the lubricant flow to the rear end location (i.e., the distal location) based on the fact that the rotation of the inner rings 12A and 12B will force the lubricant into the distal inner ring 12B, without loss in the central passages 46.

Therefore, in operation, the bearing assembly 10 is lubricated by: feeding a lubricating fluid to the proximal axial slots 32A of the proximal inner ring 12A; diverting a first part of the lubricating fluid into proximal passages 44A defined into the proximal inner ring 12A in a first plurality of the proximal axial slots 32A; directing a second part of the lubricating fluid from a second plurality of the proximal axial slots 32A to a circumferential slot 34 defined at junction between the proximal inner ring 12A and a distal inner ring 12B; diverting a portion of the second part of the lubricating fluid into central passages 46 in fluid communication with a roller volume; directing another portion of the second part of the lubricating fluid from the circumferential slot 34 to a fraction of a plurality of distal axial slots 32B of a distal inner ring 12B and into distal passages 44B defined into the distal inner ring 12B. The method may be performed when the proximal axial slots 32A are not axially aligned with the distal axial slots 32B.

The above description is meant to be exemplary only, and one skilled in the art will recognize that changes may be made to the embodiments described without departing from the scope of the invention disclosed. For example, the bearing assembly 10 is used as a high speed bearing to support the compressor shaft or the turbine shaft of a gas turbine engine. The axial slots 32B may not extend all the way to the distal axial faces 38, but would be extend only to the related distal passages 44B. Still other modifications which fall within the scope of the present invention will be apparent to those skilled in the art, in light of a review of this disclosure, and such modifications are intended to fall within the appended claims.

The invention claimed is:

1. A bearing assembly comprising:
an outer ring defining a central axis of rotation for the bearing assembly;
an inner ring assembly disposed radially inwardly of the outer ring and cooperating therewith to form a roller volume, the inner ring assembly having a proximal inner ring, a distal inner ring, and a single circumferential slot in an inner circumferential surface of the inner ring assembly, the circumferential slot being in fluid communication with the roller volume through central passages in the inner ring assembly,
the proximal inner ring including proximal axial slots formed in, extending axially along and circumferentially spaced around a proximal portion of the inner circumferential surface, each said proximal axial slots extending axially from openings in an axial face of the proximal inner ring to the circumferential slot defined in the inner circumferential surface, a first plurality of the proximal axial slots being in fluid communication with the roller volume through respective proximal passages in the proximal inner ring, a second plurality of the proximal axial slots being without proximal passages in the proximal inner ring so as not to be in fluid communication with the roller volume, and
the distal inner ring including distal axial slots formed in, extending axially along and circumferentially spaced around a distal portion of the inner circumferential surface, each said distal axial slots being in fluid communication with the roller volume through respective distal passages in the distal inner ring, the distal axial slots extending axially from the circumferential slot at least to respective ones of the distal passages in fluid communication with the roller volume, wherein a circumferential spacing between adjacent proximal axial slots is equivalent to a circumferential spacing between adjacent distal axial slots, and wherein a depth of continuous axial slots each formed of a pair of one of the proximal axial slot and then one of the distal axial slots increases from the axial face of the proximal inner ring to the respective distal passages; and
ball bearing elements in the roller volume rollingly disposed against an inner circumferential surface of the outer ring and an outer circumferential surface of the inner ring, the bearing elements allowing relative rotational motion between the outer ring and the inner ring.

2. The bearing assembly according to claim 1, wherein one of four of the proximal axial slots has one said proximal passages.

3. The bearing assembly according to claim 1, wherein the circumferential slot is concurrently defined by a circumferential slot portion in the proximal inner ring, and another circumferential slot portion in the distal inner ring.

4. The bearing assembly according to claim 1, wherein the distal axial slots extend from the single circumferential slot to a distal axial face of the distal ring.

5. The bearing assembly according to claim 1, wherein the inner ring assembly comprises a ratio of one said central passage for two said distal passages.

6. The bearing assembly according to claim 1, wherein the inner ring assembly comprises a ratio of two said central passages for one said proximal passages.

7. The bearing assembly according to claim 1, wherein the single circumferential slot is continuous over 360 degrees.

8. The bearing assembly according to claim 1, wherein a number of the proximal axial slots is equal to a number of the distal axial slots.

9. The bearing assembly according to claim 1, wherein a depth of the distal axial slots increases from the circumferential slot to the respective distal passages, the distal axial slots being at least as deep as the circumferential slots at a junction between distal axial slots and circumferential slot.

10. A bearing assembly comprising:
an outer ring defining a central axis of rotation for the bearing assembly;
an inner ring assembly disposed radially inwardly of the outer ring and cooperating therewith to form a roller volume, the inner ring assembly having a proximal inner ring, a distal inner ring, and a single circumferential slot in an inner circumferential surface of the inner ring assembly, the circumferential slot being in fluid communication with the roller volume through central passages in the inner ring assembly,
the proximal inner ring including proximal axial slots formed in, extending axially along and circumferentially spaced around a proximal portion of the inner circumferential surface, each said proximal axial slots extending axially from openings in an axial face of the proximal inner ring to the circumferential slot defined in the inner circumferential surface, a first plurality of the proximal axial slots being in fluid communication with the roller volume through respective proximal passages in the proximal inner ring, a second plurality of the proximal axial slots being without proximal passages in the proximal inner ring so as not to be in fluid communication with the roller volume, and
the distal inner ring including distal axial slots formed in, extending axially along and circumferentially spaced around a distal portion of the inner circumferential surface, each said distal axial slots being in fluid communication with the roller volume through respective distal passages in the distal inner ring, the distal axial slots extending axially from the circumferential slot at least to respective ones of the distal passages in fluid communication with the roller volume, wherein a same number of the proximal axial slots and the distal axial slots are provided, and wherein a depth of continuous axial slots each formed of a pair of one of the proximal axial slot and then one of the distal axial slots increases from the axial face of the proximal inner ring to the respective distal passages; and
ball bearing elements in the roller volume rollingly disposed against an inner circumferential surface of the outer ring and an outer circumferential surface of the inner ring, the bearing elements allowing relative rotational motion between the outer ring and the inner ring.

11. The bearing assembly according to claim 10, wherein one of four of the proximal axial slots has one said proximal passages.

12. The bearing assembly according to claim 10, wherein the circumferential slot is concurrently defined by a circumferential slot portion in the proximal inner ring, and another circumferential slot portion in the distal inner ring.

13. The bearing assembly according to claim 10, wherein the distal axial slots extend from the single circumferential slot to a distal axial face of the distal ring.

14. The bearing assembly according to claim 10, wherein the inner ring assembly comprises a ratio of one said central passage for two said distal passages.

15. The bearing assembly according to claim 10, wherein the inner ring assembly comprises a ratio of two said central passages for one said proximal passages.

16. The bearing assembly according to claim 10, wherein the single circumferential slot is continuous over 360 degrees.

17. The bearing assembly according to claim 10, wherein a depth of the distal axial slots increases from the circumferential slot to the respective distal passages, the distal axial slots being at least as deep as the circumferential slots at a junction between distal axial slots and circumferential slot.

18. A bearing assembly comprising:
an outer ring defining a central axis of rotation for the bearing assembly;
an inner ring assembly disposed radially inwardly of the outer ring and cooperating therewith to form a roller volume, the inner ring assembly having a proximal inner ring, a distal inner ring, and a single circumferential slot in an inner circumferential surface of the inner ring assembly, the circumferential slot being in fluid communication with the roller volume through central passages in the inner ring assembly,
the proximal inner ring including proximal axial slots formed in, extending axially along and circumferentially spaced around a proximal portion of the inner circumferential surface, each said proximal axial slots extending axially from openings in an axial face of the proximal inner ring to the circumferential slot defined in the inner circumferential surface, a first plurality of the proximal axial slots being in fluid communication with the roller volume through respective proximal passages in the proximal inner ring, a second plurality of the proximal axial slots being without proximal passages in the proximal inner ring so as not to be in fluid communication with the roller volume, and
the distal inner ring including distal axial slots formed in, extending axially along and circumferentially spaced around a distal portion of the inner circumferential surface, each said distal axial slots being in fluid communication with the roller volume through respective distal passages in the distal inner ring, the distal axial slots extending axially from the circumferential slot at least to respective ones of the distal passages in fluid communication with the roller volume, wherein a circumferential spacing between adjacent proximal axial slots is equivalent to a circumferential spacing between adjacent distal axial slots, and wherein a depth of the distal axial slots increases from the circumferential slot to the respective distal passages, the distal axial slots being at least as deep as the circumferential slots at a junction between distal axial slots and circumferential slot; and
ball bearing elements in the roller volume rollingly disposed against an inner circumferential surface of the outer ring and an outer circumferential surface of the inner ring, the bearing elements allowing relative rotational motion between the outer ring and the inner ring.

19. The bearing assembly according to claim 18, wherein one of four of the proximal axial slots has one said proximal passages.

20. The bearing assembly according to claim 18, wherein the circumferential slot is concurrently defined by a circumferential slot portion in the proximal inner ring, and another circumferential slot portion in the distal inner ring.

21. The bearing assembly according to claim 18, wherein the distal axial slots extend from the single circumferential slot to a distal axial face of the distal ring.

22. The bearing assembly according to claim 18, wherein the inner ring assembly comprises a ratio of one said central passage for two said distal passages.

23. The bearing assembly according to claim 18, wherein the inner ring assembly comprises a ratio of two said central passages for one said proximal passages.

24. The bearing assembly according to claim 18, wherein the single circumferential slot is continuous over 360 degrees.

25. The bearing assembly according to claim 18, wherein a number of the proximal axial slots is equal to a number of the distal axial slots.

26. A bearing assembly comprising:
an outer ring defining a central axis of rotation for the bearing assembly;
an inner ring assembly disposed radially inwardly of the outer ring and cooperating therewith to form a roller volume, the inner ring assembly having a proximal inner ring, a distal inner ring, and a single circumferential slot in an inner circumferential surface of the inner ring assembly, the circumferential slot being in fluid communication with the roller volume through central passages in the inner ring assembly,
the proximal inner ring including proximal axial slots formed in, extending axially along and circumferentially spaced around a proximal portion of the inner circumferential surface, each said proximal axial slots extending axially from openings in an axial face of the proximal inner ring to the circumferential slot defined in the inner circumferential surface, a first plurality of the proximal axial slots being in fluid communication with the roller volume through respective proximal passages in the proximal inner ring, a second plurality of the proximal axial slots being without proximal passages in the proximal inner ring so as not to be in fluid communication with the roller volume, and
the distal inner ring including distal axial slots formed in, extending axially along and circumferentially spaced around a distal portion of the inner circumferential surface, each said distal axial slots being in fluid communication with the roller volume through respective distal passages in the distal inner ring, the distal axial slots extending axially from the circumferential slot at least to respective ones of the distal passages in fluid communication with the roller volume, wherein a same number of the proximal axial slots and the distal axial slots are provided, and wherein a depth of the distal axial slots increases from the circumferential slot to the respective distal passages, the distal axial slots being at least as deep as the circumferential slots at a junction between distal axial slots and circumferential slot; and
ball bearing elements in the roller volume rollingly disposed against an inner circumferential surface of the outer ring and an outer circumferential surface of the inner ring, the bearing elements allowing relative rotational motion between the outer ring and the inner ring.

27. The bearing assembly according to claim 26, wherein one of four of the proximal axial slots has one said proximal passages.

28. The bearing assembly according to claim 26, wherein the circumferential slot is concurrently defined by a circumferential slot portion in the proximal inner ring, and another circumferential slot portion in the distal inner ring.

29. The bearing assembly according to claim 26, wherein the distal axial slots extend from the single circumferential slot to a distal axial face of the distal ring.

30. The bearing assembly according to claim 26, wherein the inner ring assembly comprises a ratio of one said central passage for two said distal passages.

31. The bearing assembly according to claim 26, wherein the inner ring assembly comprises a ratio of two said central passages for one said proximal passages.

32. The bearing assembly according to claim 26, wherein the single circumferential slot is continuous over 360 degrees.

* * * * *